United States Patent [19]

Collins

[11] 4,320,654

[45] Mar. 23, 1982

[54] SYSTEM FOR DETECTING CRACKS IN THE HEAT-INSULATING LINING OF A CONTAINER FOR LIQUEFIED GAS

[75] Inventor: Michael H. Collins, Huxley, near Chester, England

[73] Assignee: Shell Internationale Research Maatchappij, The Hague, Netherlands

[21] Appl. No.: 140,154

[22] Filed: Apr. 14, 1980

[30] Foreign Application Priority Data

May 29, 1979 [GB] United Kingdom ............... 18657/79

[51] Int. Cl.³ .............................................. G01M 3/04
[52] U.S. Cl. ...................................... 73/40.7; 220/445
[58] Field of Search ....................... 73/40.5, 40.7, 49.2; 62/45; 220/419, 426, 445

[56] References Cited

U.S. PATENT DOCUMENTS

| | | |
|---|---|---|
| 3,489,311 | 1/1970 | Folkerts et al. ...................... 73/40.7 |
| 3,913,341 | 10/1975 | Katsuta . |
| 3,921,438 | 11/1975 | Katsuta . |
| 3,946,892 | 3/1976 | Rigal ................................... 220/445 |
| 4,023,617 | 5/1977 | Carlson et al. ......................... 62/45 |

FOREIGN PATENT DOCUMENTS 1381358 1/1975 United Kingdom .

*Primary Examiner*—S. Clement Swisher
*Attorney, Agent, or Firm*—Pravel, Gambrell, Hewitt, Kirk, Kimball & Dodge

[57] ABSTRACT

A problem with tanks for storing liquefied gases is the development of cracks in the heat-insulating lining of the tank. Methods have been proposed for the detection of cracks occurring in the lining comprising passing a purging gas, for example nitrogen, through a channelled layer in the heat-insulating lining to a gas-analyzer. Contamination of the purging gas by the contents of the tank, which can be detected by the gas-analyzer, indicates the presence of a crack in the heat-insulating lining. The invention is directed to an improved design of the channelled layer, so that a uniform distribution of the purging gas along an area to be watched for the development of cracks is obtained.

8 Claims, 4 Drawing Figures

SYSTEM FOR DETECTING CRACKS IN THE HEAT-INSULATING LINING OF A CONTAINER FOR LIQUEFIED GAS

The invention relates to a system for detecting cracks in the heat-insulating lining of a container for liquefied gas having a rigid outer shell internally provided with a heat-insulating lining.

Normally the rigid outer shell of such a container is made of a material, for example normal steel, which is not able to withstand the low temperature of the liquefied gas stored in the container. When a crack develops in the heat-insulating lining of such a container, there is a risk that the contents of the container will cool down the outer shell. In the event that the contents of the container consists, for example, of liquefied natural gas, having a temperature of minus 160° C., the outer shell may cool down to such a degree, that, when the outer shell is made of normal steel, it would become brittle and would even deteriorate. Therefore, it is important to have a system by means of which the development of cracks in the heat-insulating lining can be detected at an early stage.

Crack detection systems have been proposed, wherein a channelled layer is incorporated in the heat-insulating lining. Purging gas, preferably nitrogen, is passed through said channelled layer to a gas-analyzer. If some of the contents of the container has leaked into the channelled layer through a crack in the lining, the presence of the crack in the lining can be detected by analyzing the purging gas.

It is the object of the invention to provide an improved embodiment of such a crack detection system, which is more reliable than the known crack detection systems.

The system for detecting cracks in the heat-insulating lining of a container for liquefied gas having a rigid outer shell internally provided with a heat-insulating lining, comprises according to the invention, a channelled layer having channels so arranged that the gas flow resistance properties of the layer are different in different directions parallel to the layer, wherein the layer is incorporated in the lining and extends along a wall area which has to be watched for the presence of a crack in the lining of said area, the layer is provided with a gas inlet and with a gas outlet for purging gas, and means are present for the supply of purging gas to the gas inlet and for the discharge of purging gas from the gas outlet to a gas-analyzer, wherein the channels in the layer are so arranged along the whole area to be watched that the directional gas flow resistance properties of the channelled layer cause the purging gas to flow from the gas inlet to the gas outlet in such a manner that the purging gas is uniformly distributed along the whole area to be watched.

The special arrangement of the channels in the channelled layer causes the purging gas to be uniformly distributed over the whole channelled layer, which has the advantage that the whole area to be watched for the presence of cracks in the heat-insulating lining is covered by the flow of purging gas.

The known crack detection systems using a channelled layer all have the disadvantage that most of the purging gas will flow from the gas inlet to the gas outlet along the shortest path. In other words no, or hardly any, purging gas tends to flow to the locations which are remote from said shortest path. In this manner only a part of the lining provided with a channelled layer can be watched effectively. Therefore the risk that a crack is present, which cannot be traced is considerable, so that the known leak detection systems are rather unreliable.

The invention will be further described with reference to the accompanying drawings, in which FIG. 1 shows a schematic view of a vertical cross-section of a heat-insulated container provided with channelled layers;

In the figures identical parts are indicted by identical reference numerals.

Figure 1:
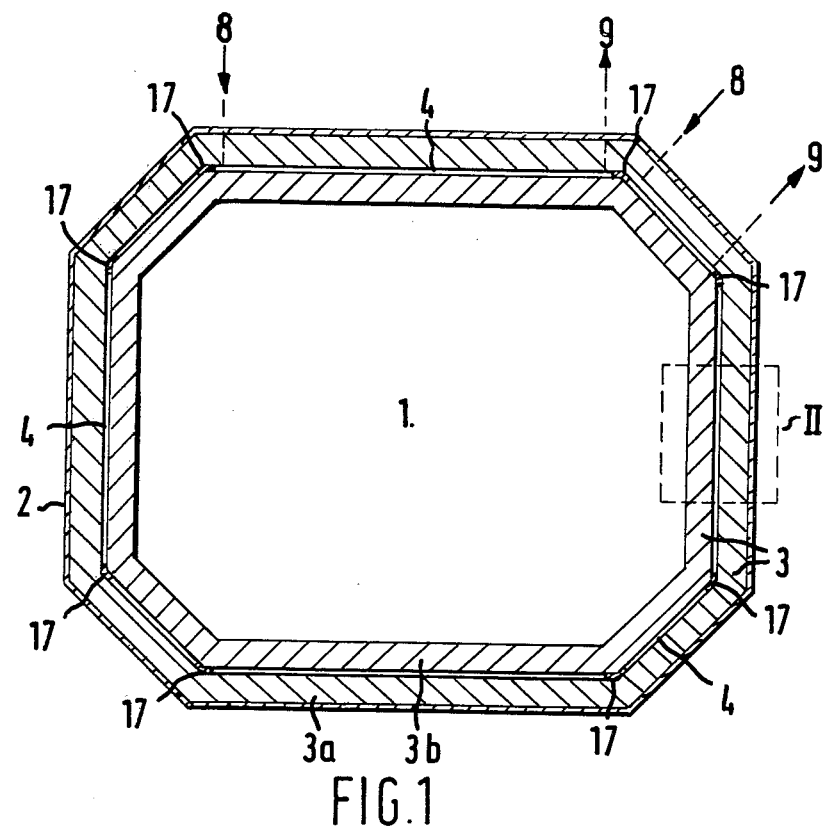
Figure 2:
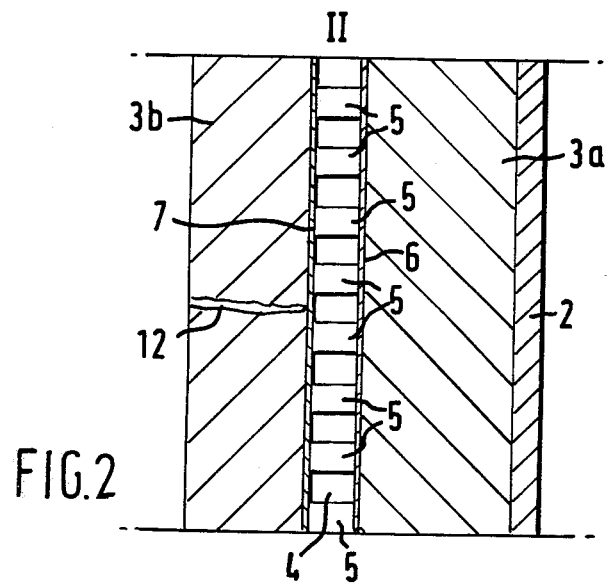
FIG. 2 shows a detail II of FIG. 1 on an enlarged scale.

Referring now to the FIGS. 1 and 2, a heat-insulated prismatic container, generally designated by reference numeral 1, comprises a rigid outer shell 2, for example made of normal steel. Along the inner surface of the outer shell 2, a lining 3 of heat-insulating material, for example polyurethane foam, is arranged. This lining 3, which is preferably applied by means of a spraying method, consists of a first heat-insulating layer 3a at the high temperature side of the container and a second heat-insulating layer 3b at the lower temperature side of the container. Between the layers 3a en 3b, a channelled layer 4 is arranged. Through this channelled layer an inert gas can be passed for detecting the presence of cracks in the layer 3b. The channelled layer 4 comprises a number of solid obstacles or studs 5, spaced apart from each other and extending between a backing sheet 6 and a closing sheet 7, to which both ends of the studs 5 are attached. The studs 5 which have a length of for example 3.5 mm, are preferably made of reinforced resin, for example a polyester resin or an epoxy resin, having for example a filling of glass cenospheres and glass fibres. The number of studs 5 per square meter is about 10,000. The backing sheet 6 consists, for example, of a polyester fleece. The closing sheet 7 must be porous to facilitate the flow of some liquefied gas stored in the container through a crack 12 in the heat-insulating layer 3b and into the channelled layer 4. The closing sheet 7 may for example be made of glasscloth impregnated with a suitable resin, such as epoxy resin. The channelled layer 4 as shown in FIG. 1 is divided in sections by barriers 17, each section covering a corresponding wall area and each section having a gas inlet 8 and a gas outlet 9 for the purging gas.

Figure 3:
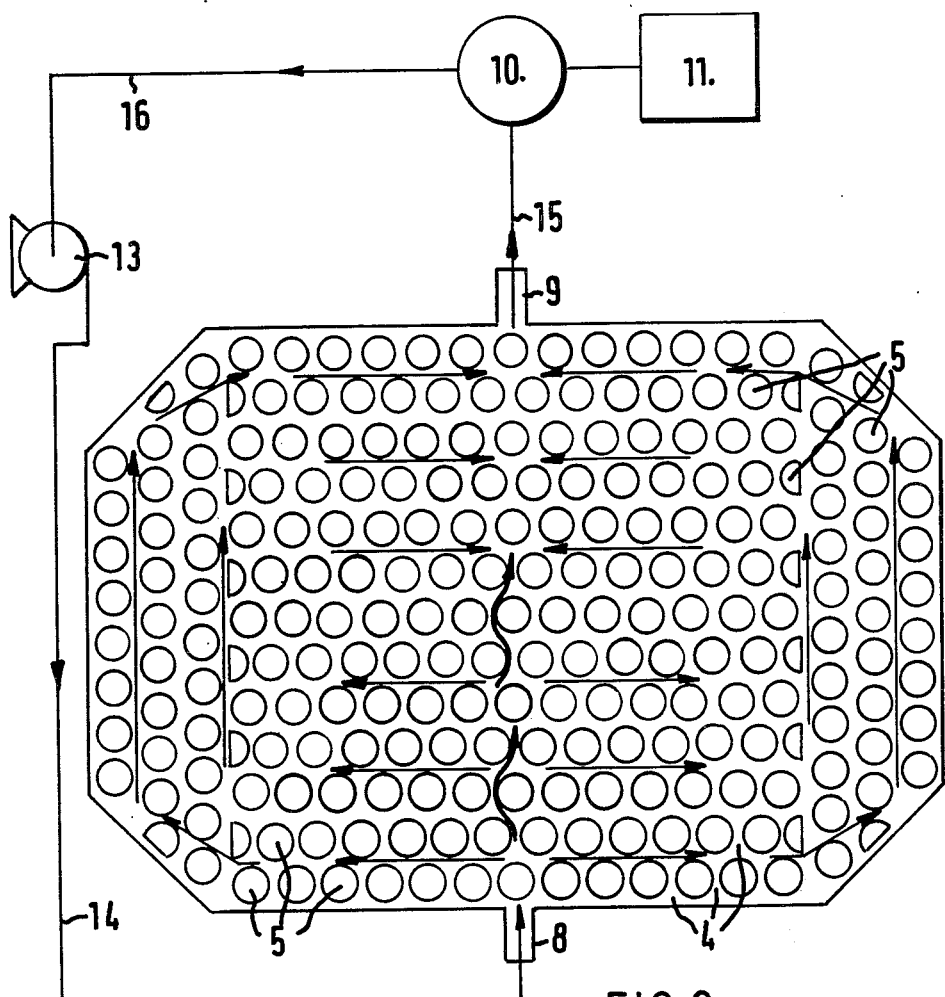
FIG. 3 is a schematic side view of an embodiment of a channelled layer according to the invention.

Referring now to FIG. 3, the channelled layer 4 is provided with a gas inlet 8 and a gas outlet 9. Inert gas, for example nitrogen serving as purging gas, is supplied by a pump 13 and through a conduit 14 and gas inlet 8 to the channelled layer 4. After the gas has passed through the channelled layer 4, it is passed through the gas outlet 9 and a conduit 15 to a gas-analyzer 10. From the gas-analyzer 10 the purging gas is recycled through a conduit 16 to the pump 13. When the purging gas is contaminated by the liquefied gas stored in the container, this contamination, and thus the presence of a crack in the heat-insulating lining 3b, is detected by the gas-analyzer 10, which then actuates a warning device 11.

Figure 4:
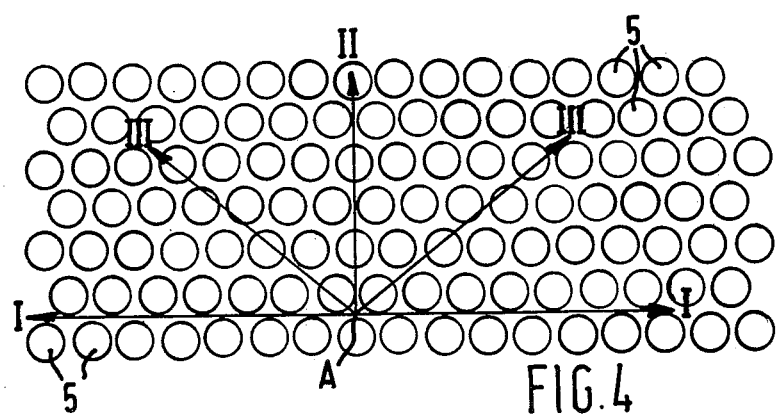
FIG. 4 shows the directional flow properties of part of the channelled layer as shown in FIG. 3.

As shown in FIG. 4 the studs 5 are so arranged that uninterrupted passages or channels are present in direction I, and interrupted passages or channels are present in directions II and III, as indicated by the respective arrows. Experiments have shown that the quantity of gas flowing in direction I was about 4 times the quantity of gas flowing in direction II when said gas was supplied at location A to the channelled layer in a direction perpendicular to the plane of said layer. During the same experiment, it was found that the quantity of gas flowing in direction III had a value between the quantities of gas flowing in directions I and II.

Referring back to FIG. 3, it is shown that in the central part of the channelped layer 4, the uninterrupted passages or channels between the studs 5 are arranged perpendicular tm the shortest path between the gas inlet 8 and the gas outlet 9. In the areas remote from said path the uninterrupted passages or channels extend parallel to said shortest path. As shown the directions of the uninterrupted passages or channels are obtained by selective placing of the studs 5. In FIG. 3, the studs 5 are shown on an enlarged scale for the sake of clarity.

When purging gas is introduced through the gas inlet 8, a considerable amount of the purging gas will flow away from the shortest path between the gas inlet 8 and the gas outlet 9 towards areas remote from the shortest path. In this manner the gas will be distributed substantially uniformly over the whole channelled layer 4 as shown by the arrows, without leaving unpurged dead spaces, so that it is ensured that the whole area to be watched will be covered by the purging gas and no cracks present in the heat-insulating lining will be overlooked.

The studs as shown in the drawings have a circular cross-section. However studs having other cross-sections can be used as well, for example studs having an octagonal cross-section.

It is observed that the invention is not restricted to a whole tank wall provided with a channelled laminate, having a single gas inlet and a single gas outlet.

Instead, it is also possible to provide only part of the tank wall with a channelled layer according to the invention, for example those parts of the wall, such as corners, which are difficult to watch with the known leak detection systems. It is also possible to provide the channelled layer with a plurality of gas inlets and/or gas outlets.

When bottom-, top- and sidewalls of a container are all provided with a channelled layer, a gas stream through all the layers can also be obtained by providing the bottomwall with a centrally placed gas inlet and the topwall with a centrally placed gas outlet. In this case the purging gas will flow from the gas inlet through the channelled layer of the bottomwall and to the periphery thereof and then through the channelled layers of all the sidewalls, to the periphery of the channelled layer of the topwall. Then the gas flows from the periphery of the topwall through the channelled layer of the topwall to the central outlet of the topwall. In that case the barriers 17 are omitted.

It is remarked that the spaces between the stud 5 can be provided with an open cell foam, if desired.

The invention is not restricted to a channelled layer having studs or obstacles spaced apart from each other, as shown in the drawings. Instead, the directional channelled layer may be made of open cell foam, with a porosity varying according to the position of the foam relative to the gas inlet and the gas outlet, so that a porous layer is obtained having gas flow resistance properties dependent on the direction parallel to the channelled layer.

Moreover it is observed that instead of bonding the obstacles to a backing sheet 6 which is bonded to the layer 3a of heat-insulating lining, the obstacles may be directly bonded to the heat-insulating layer 3a.

If desired, more than one channelled layer can be used. It is, for example, possible to use an additional channelled layer 4 in the heat-insulating layer 3a and close to the rigid outer shell 2 for detecting cracks developing in the heat-insulating layer 3a.

I claim:

1. A system for detecting cracks in the heat-insulating lining of a container for liquefied gas having a rigid outer shell internally provided with a heat-insulating lining, wherein the crack detecting system comprises a channelled layer having studs spaced apart in such a manner that channels are formed between the studs, wherein the studs are so arranged that the gas flow resistance properties of the channelled layer are different in different directions parallel to the channelled layer, wherein the channelled layer is incorporated in the lining and extends along a wall area which has to be watched for the presence of a crack in the lining of said area, the channelled layer is provided with a gas inlet and with a gas outlet for purging gas, and means are present for the supply of purging gas to the gas inlet and for the discharge of purging gas from the gas outlet to a gas-analyzer, and wherein the studs in the channelled layer are so arranged along the whole area to be watched that the directional gas flow resistance properties of the channelled layer cause the purging gas to flow through the channels in the channelled layer from the gas inlet to the gas outlet in such a manner that the purging gas is uniformly distributed along the whole area to be watched.

2. The system as claimed in 1, wherein the studs in the channelled layer are so arranged along a wall to be watched that:
   (a) the resistance to gas flow is relatively high along the shortest path between the gas inlet and the gas outlet and in a direction substantially parallel to the said shortest path up to a predetermined distance from the said shortest path;
   (b) the resistance to gas flow is relatively low in a direction substantially cross-wise to said shortest path up to said predetermined distance and in a direction substantially parallel to said shortest path more remote from the said shortest path than the said predetermined distance.

3. A system for detecting cracks as claimed in claim 2, applied to at least one wall of a prismatic container.

4. A system for detecting cracks as claimed in claim 1, wherein the studs are made of a reinforced resin.

5. A system for detecting cracks as claimed in claim 1, wherein the number of studs per square meter is about 10,000.

6. A system for detecting cracks as claimed in claim 1, wherein the length of the studs is about 3.5 mm.

7. A system for detecting cracks as claimed in claim 1, wherein the studs have a cross-sectional shape which is octagonal.

8. A system for detecting cracks as claimed in claim 1, wherein open cell foam is arranged between the studs.

* * * * *